G. J. THOMAS.
AXLE.
APPLICATION FILED AUG. 28, 1920.
1,373,033.
Patented Mar. 29, 1921.
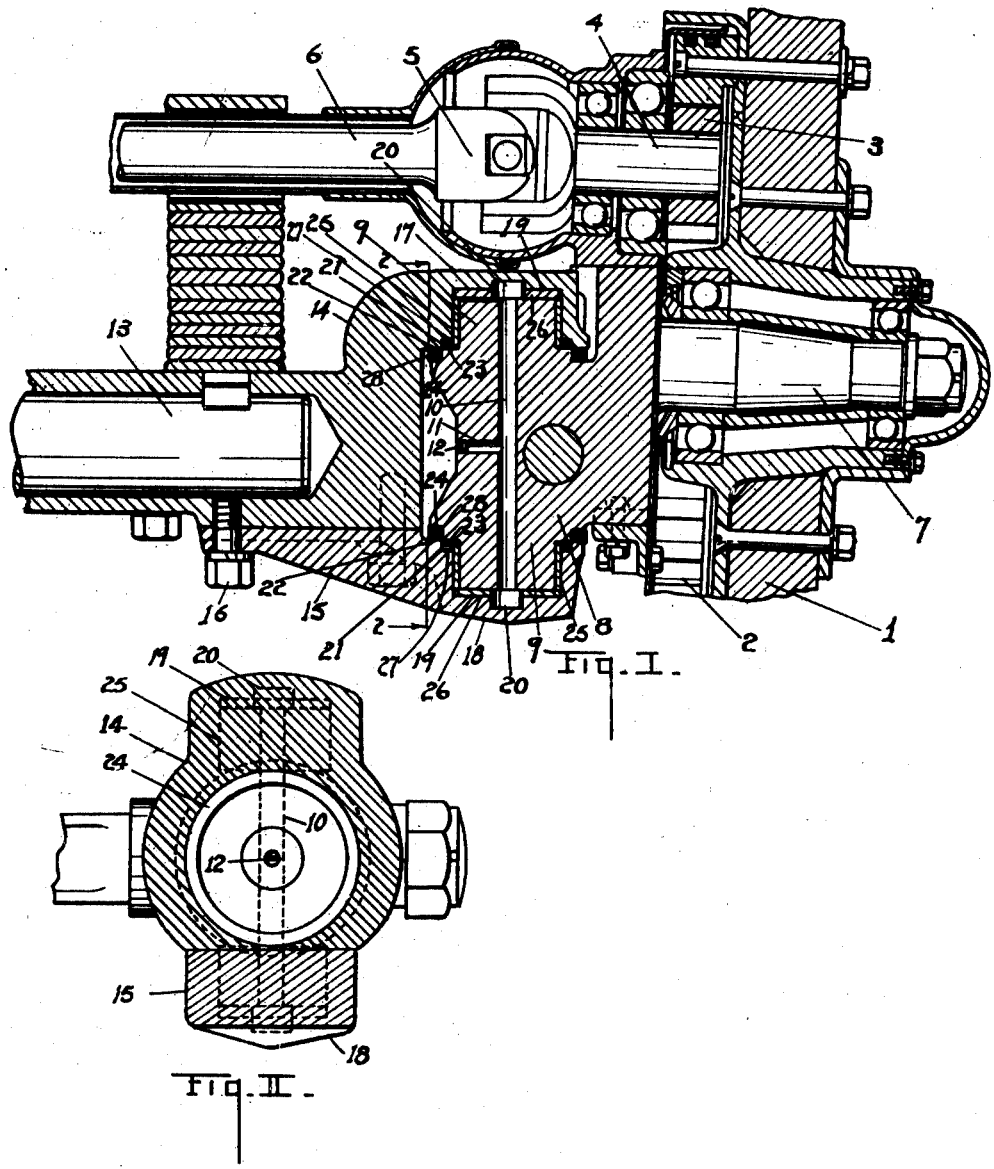
Fig. I.
Fig. II.
Witnesses
Lenn Gilman
M. Louise Thurston
Inventor
George J. Thomas
By Chappell & Earl
Attorneys

UNITED STATES PATENT OFFICE.

GEORGE J. THOMAS, OF LANSING, MICHIGAN.

AXLE.

1,373,033.  Specification of Letters Patent.  Patented Mar. 29, 1921.

Application filed August 28, 1920. Serial No. 406,654.

*To all whom it may concern:*

Be it known that I, GEORGE J. THOMAS, a citizen of the United States, residing at Lansing, county of Ingham, State of Michigan, have invented certain new and useful Improvements in Axles, of which the following is a specification.

This invention relates to improvements in axles.

The main objects of this invention are:

First, to provide an improved axle having a pivoted spindle which is simple in structure and at the same time possesses great strength.

Second, to provide an improved axle having these advantages in which the bearings are effectively lubricated and dust and dirt effectively excluded therefrom.

Third, to provide an improved axle of the pivoted spindle type in which the parts are economical to produce and easily assembled and disassembled.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail view partially in longitudinal section of a structure embodying the features of my invention.

Fig. II is a detail transverse section on a line corresponding to line 2—2 of Fig. I.

In the drawing similar reference characters refer to similar parts throughout both views.

Referring to the drawing, 1 represents the steering wheel of a motor vehicle. The steering wheel illustrated is a driven or traction wheel, it having an internal gear 2 secured thereto and driven from the pinion 3 on the shaft 4. This shaft is connected by the universal joint 5 to a driving shaft 6. As the details of the bearings of the wheel on its spindle 7 and these driving connections form no part of my present invention, I do not describe the same herein.

The spindle 7 is carried by a spindle member 8 having integral oppositely projecting pintles 9. I have found it practical and very satisfactory in practice to form the spindle member as a drop forging, the spindle 7 being formed integrally therewith.

The spindle member has a bore-like lubricant chamber 10 therein opening at the ends of the pintle. This chamber has a lateral filling opening 11 closed by the plug 12.

The axle in the structure illustrated comprises the bar-like body 13 to which the axle member 14 is rigidly secured. The details of this connection, however, form no part of this invention and are therefore not described herein. The second axle member 15 is detachably and rigidly secured on the under side of the member 14 by means of the cap screws 16.

The axle member 14 has a pintle arm 17 while the axle member 15 has an opposed pintle arm 18. These pintle arms are provided with socket-like bearings 19 for the pintles of the spindle member, the axle member 15 being made detachably or separate so that the structure can be assembled and disassembled.

These bearings are provided with recesses 20 registering with the lubricant chamber of the spindle member. The axle members are provided with annular packing ring seats 21 surrounding bearings 19 and with annular packing faces 22 surrounding the packing ring seats. The spindle member is provided with annular packing faces 23 opposed to the packing ring seats of the axle member and with annular packing ring seats 24 surrounding packing faces of the spindle member and opposed to the packing faces of the axle member.

The bearings are provided with bushings 25 and with end thrust plates 26 adapted to coact with the ends of the spindle for carrying the load. The packing rings 27 are disposed in the packing ring seats in the axle members to surround the bushings 25 and to coact with the packing faces of the spindle member.

The packing rings 28 are disposed in packing ring seats of the spindle member to coact with the packing faces of the axle member. These packing ring seats and packing faces are in the form of shoulders in their respective parts so that they are very easily machined.

The packing rings 28 serve mainly as dust and dirt excluders while the packing rings 27 serve mainly as lubricant retainers effectively retaining the lubricant within the bearings. The lubricant chamber may be filled with lubricant and it is found that it is retained effectively for a long period of time and that the dirt is effectively excluded so that while the parts pivot freely and are subject to considerable movement and are exposed to dust and dirt, the dust and dirt are effectively excluded from the bearings.

This arrangement permits the assembling of the packings in their seats and the assembling of parts without distortion or displacement of the packings. The parts are simple and economical to produce as they are largely duplicates. The end thrust is borne by the ends of the spindles so that proper bearings may be provided and great durability is secured, the spindles wearing for a long time without becoming loose, and when worn new bushings and thrust plates may be provided, it being a simple matter to replace the same.

The pintles can be made of large diameter which is of advantage where the structure is used in trucks and particularly where used as driving or traction wheels.

I have illustrated and described my invention in the form in which I have embodied it for the market and found very practical. I have not attempted to illustrate or describe certain other modifications and adaptations which might be desirable for particular structures or designs as I believe the disclosure made will enable those skilled in the art to which my invention relates to embody or adapt the same as may be desired.

Having thus described my invention, what I claim as new and desire to secure by Letters Patent is:

1. In an axle, the combination with a spindle member provided with oppositely projecting integral pintles and having annular shoulder-like packing faces at the bases of the pintles, said pintle members having a lubricant chamber disposed axially of the pintles and opening at their ends and provided with a lateral filling opening, an axle member provided with an integral upper pintle arm, a lower pintle arm rigidly and detachably secured to the under side of said axle member, said pintle arms having opposed socket-like bearings for said pintles and annular shoulder-like packing seats in their faces surrounding said bearings and opposed to the packing faces of the spindle and annular packing faces opposed to the said packing seats of the spindle member, said bearings having lubricant recesses registering with the lubricant chamber of the pintle, bushings for said bearings, end plates for said bearings with which the ends of the pintles coact to carry the load, and packing rings arranged in said packing ring seats of said axle members surrounding said bushings and coacting with said packing faces of said spindle member.

2. In an axle, the combination with a spindle member provided with oppositely projecting integral pintles and having annular shoulder-like packing faces at the bases of the pintles, an axle member provided with an integral upper pintle arm, a lower pintle arm rigidly and detachably secured to the under side of said axle member, said pintle arms having opposed socket-like bearings for said pintles and annular shoulder-like packing seats in their faces surrounding said bearings and opposed to the packing faces of the spindle and annular packing faces opposed to the said packing seats of the spindle member, end plates for said bearings with which the ends of the pintles coact to carry the load, and packing rings arranged in said packing ring seats of said axle members surrounding said bushings and coacting with said packing faces of said spindle member.

In witness whereof, I have hereunto set my hand and seal in the presence of two witnesses.

GEORGE J. THOMAS. [L. S.]

Witnesses:
H. M. LEE,
G. W. HEWITT.